United States Patent [19]
Robson et al.

[11] Patent Number: 5,615,336
[45] Date of Patent: *Mar. 25, 1997

[54] SELECTIVE USER COUPLING FOR SHARED OBJECT ORIENTED COMPUTER SYSTEM

[75] Inventors: Christopher Robson; Hugh Duggan, both of Bristol, Great Britain; William Morel, Redmond, Wash.

[73] Assignee: Hewlett-Packard Company, Palo Alto, Calif.

[ * ] Notice: The portion of the term of this patent subsequent to Jun. 29, 2013, has been disclaimed.

[21] Appl. No.: 778,839

[22] PCT Filed: Apr. 30, 1991

[86] PCT No.: PCT/GB91/00689

§ 371 Date: Dec. 30, 1992

§ 102(e) Date: Dec. 30, 1992

[87] PCT Pub. No.: WO91/17498

PCT Pub. Date: Nov. 14, 1991

[30]  Foreign Application Priority Data

Apr. 30, 1990 [GB] United Kingdom .................. 9009701

[51] Int. Cl.[6] .............................................. G06F 15/163
[52] U.S. Cl. .................................. 395/683; 364/DIG. 1; 364/284.1; 364/230.4
[58] Field of Search .................................. 395/200, 425, 395/100, 154, 156, 600; 364/DIG. 1, DIG. 2

[56]  References Cited

U.S. PATENT DOCUMENTS

| 4,785,472 | 11/1988 | Shapiro | 379/96 |
|---|---|---|---|
| 4,974,173 | 11/1990 | Stefik et al. | 364/521 |
| 5,008,853 | 4/1991 | Bly et al. | 364/900 |
| 5,159,669 | 10/1992 | Trigg et al. | 395/159 |
| 5,206,934 | 4/1993 | Naef, III | 395/200 |
| 5,220,657 | 6/1993 | Bly et al. | 395/425 |

OTHER PUBLICATIONS

Sarin, S.K. et al., "Software for Interactive On-Line Conferences," 2nd ACM-SIGOA Conf. on Office Information Systems, Toronto, Canada, Jun. 25-27, 1984, pp. 46-58.

Motro et al., "The Design of KIVIEW: An Object-Oriented Browser," Proc. from the 2nd Int'l. Conf. on Expert Database Systems, vol. XIII, Apr. 1988, pp. 107-131.

Heiler et al., "An Object-Oriented Approach to Data Management: Why Design Databases Need It", Pro. from the 24th ACM-IEEE Design Automation Conf. 1987, pp. 335-340.

G. Wiederhold, "Views, Objects, and Databases", Computer, vol. 19, No. 12, Dec. 1986, pp. 37-44.

*Primary Examiner*—Thomas G. Black
*Assistant Examiner*—Maria N. Von Buhr

[57]  ABSTRACT

An object based computer system has viewers which may be directed around the object world of the system. A coupling facility is provided whereby viewers may be linked equally or in a hierarchy so that information is passed between them concerning the objects being viewed. Viewers may thus follow one another voluntarily or automatically for mutual working, demonstration or tuition, for example.

6 Claims, 6 Drawing Sheets

SELECTIVE USER COUPLING FOR SHARED OBJECT ORIENTED COMPUTER SYSTEM

FIELD OF THE INVENTION

The invention relates to an object based computer system.

BACKGROUND OF THE INVENTION

Object based computer systems facilitate multi-tasking and multi-user operations where common data files may be accessed concurrently by different tasks operated from the same terminal or operated by different users employing respective terminals. A windows environment is generally employed in conjunction with an object based system to enable windows to be allocated to respective concurrent tasks. There follows an overview of an object based system in a windows environment which will help define terms used herein.

An OBJECT is a combination of data and method code which is normally stored on disk. An object may be INACTIVE, when it is identified simply as a disk file, or ACTIVE, when it has a PROCESS, or executable file, associated with it. When active, at least parts of the object are held in the computer RAM and the object is defined by the state of the associated process rather than by its file.

Objects can be LINKED to other objects so that changes in one are reflected in the object or objects with which it is linked by virtue of MESSAGES which are passed between the linked objects. The system is controlled by an OBJECT MANAGER which is an application running in the windows environment and which controls activation and deactivation of objects, and the passage of messages between objects.

An object is sometimes a CONTAINER which contains as notional parts other objects. Examples of container objects in a distributed office system are a desktop, folder and a document. A VARIABLE DIMENSION DATA OBJECT (VDO) is a data store of which the values of elements may be viewed and changed directly by a user.

Object based systems have suffered the disadvantage common to multi-tasking or multi-user systems sharing data files. This is that although, with careful record-locking procedures, different tasks or users can, in concurrent sessions, alter data in the same data file (or object) each alteration and display is effectively carried out independently. The users do not have immediate cross-references and updating to changes made by other users to the data file at the same time.

We have devised a solution to this problem which depends on splitting an object between a SEMANTIC part (which defines the state of the object) and a PRESENTATION part (for presenting to a user the state of the object). Indeed, conceptually one can think of there being separate semantic objects and presentation objects. In addition, when using a windows user interface, there are windows for viewing objects and facilitating multi-tasking. In this specification, the presentation part or presentation object is something which is utilised by a window and forms part of the window for the time in which the window is viewing the object in question and generally a distinction between the window and the presentation part or object will not be made.

Semantic objects have data stored in a particular storage domain. A storage domain may be regarded as closely equivalent to a storage medium such as a hard disc or floppy disc in the sense that all objects in a given storage domain are on-line together or are off-line together. Consequently, a single machine may support a plurality of storage domains.

The present invention could be applied in a single computer having one or more storage domains but is primarily concerned with an object based system having a plurality of user stations. Such a system may be provided by a single central processing device having a plurality of user stations coupled to it, or it may be provided by a distributed processing network consisting of a number of independent processing units each having a respective station associated with it. In the system of the present invention an object has an implicit presentation, which will look the same however viewed.

It is possible to open one or more windows on each object. The windows manage the display and input/output (lexical) interaction in the system. The user of multiple windows in conjunction with an object enables employment of the techniques of sharing (multiple windows to a common object) and distributed (window on one machine and object on another) applications.

We define a VIEWER as an object which allows users to access other objects by providing the appearance of the object to the user and accepting user input for data manipulation. Viewers have hitherto been known as TASK WINDOWS, but a window is part only of the viewer. The object being viewed controls its own state and provides the methods for access to and manipulation of that state.

When sharing or multi-user operations are being effected, each task or user associated with a particular object is a REFEREE of that object. It is ensured that each active object retains references to its referees so that they are sent messages to be notified of changes during object processing.

The semantic/presentation split allows multiple viewers to be attached to an object. It is important to remember in this case that all viewers are seeing the same object, not a version of it. This is important, as we have a basically 'physical' model of the object world, when a user manipulates an object he is actually physically changing it for everyone. This could lead to conflict when two or more users are trying to manipulate the same thing. A solution is to provide a presence mechanism whereby referees of an object being viewed are notified of the presence of each other by indications in their respective viewers.

Indication of the presence of concurrent viewers of an object greatly facilitates the user's vision of the system and under-pins the user model which the system establishes. Instead of merely observing the effects of his own manipulations of data the user can be aware that other viewers are present and thus capable of separate manipulation of the same data.

A user always knows what he has requested by way of a manipulation. This is the local feedback provided by the viewer. The underlying object updates all viewers of its state, thus the user will see the end effect. In such conflict conditions it is not possible to guarantee that the request and the end effect match, but the user will not be misled as to what has happened. One of the important benefits of the presence mechanism is to help explain these situations to the user. The semantic/presentation split also allows viewers to be remote (from the object), without the user losing the benefit of immediate feedback of his manipulations.

Users themselves can move from one terminal to another. The identity of the users is obtained from Personal Identity Cards which they use to log on to the system.

The present invention builds on the facility of the presence mechanism to provide an advantageous coupling facility for viewers.

SUMMARY OF THE INVENTION

According to the present invention there is provided an object based computer system having at least one computer with a central processor unit, random access memory and program and data storage facilities, the computer being programmed to run in a windows environment and having an object manager whereby objects are activated, the objects being capable of being linked, objects being subject to a semantic/presentation split whereby multiple viewers can be linked to an object to allow concurrent observation and manipulation, a presence mechanism is provided whereby referees of an object being viewed are notified of the presence of each other by indications in their respective viewers, and a coupling mechanism is provided whereby different viewers may be coupled together in a set so that navigation within the system of one viewer by its user has the effect of passing navigational messages to the other viewer or viewers in the set so that those other viewers may indicate and/or follow the navigation positions of the said one viewer. With this coupling facility, a first user can, via his viewer, conduct one or more other viewers around the system for guidance, instruction, or co-operative work.

Although the coupling mechanism may implement only navigational display messages, the principal advantage lies in the application of the navigational message to drive the coupled viewers in company with each other around the system. With such an arrangement, a hierarchy is preferably established, whereby one viewer is the guide and the or each other viewer is a follower.

Preferably the system is such that in establishing a coupling relationship, each user is presented with options on how to deal with incoming navigational messages and can elect to accept them as commands, thereby becoming a follower, or not.

A convenient way of effecting coupling is to arrange that the viewers in question rendezvous on a particular object so that on both presentation screens there are presence indicators of the concurrent viewers on that object, and effecting a graphical link, for example a chain, between the indicators corresponding to the viewers to be coupled.

BRIEF DESCRIPTION OF THE DRAWINGS

The invention will further be described with reference to the accompanying drawings, of which.

DETAILED DESCRIPTION OF THE DRAWINGS

Figure 1:
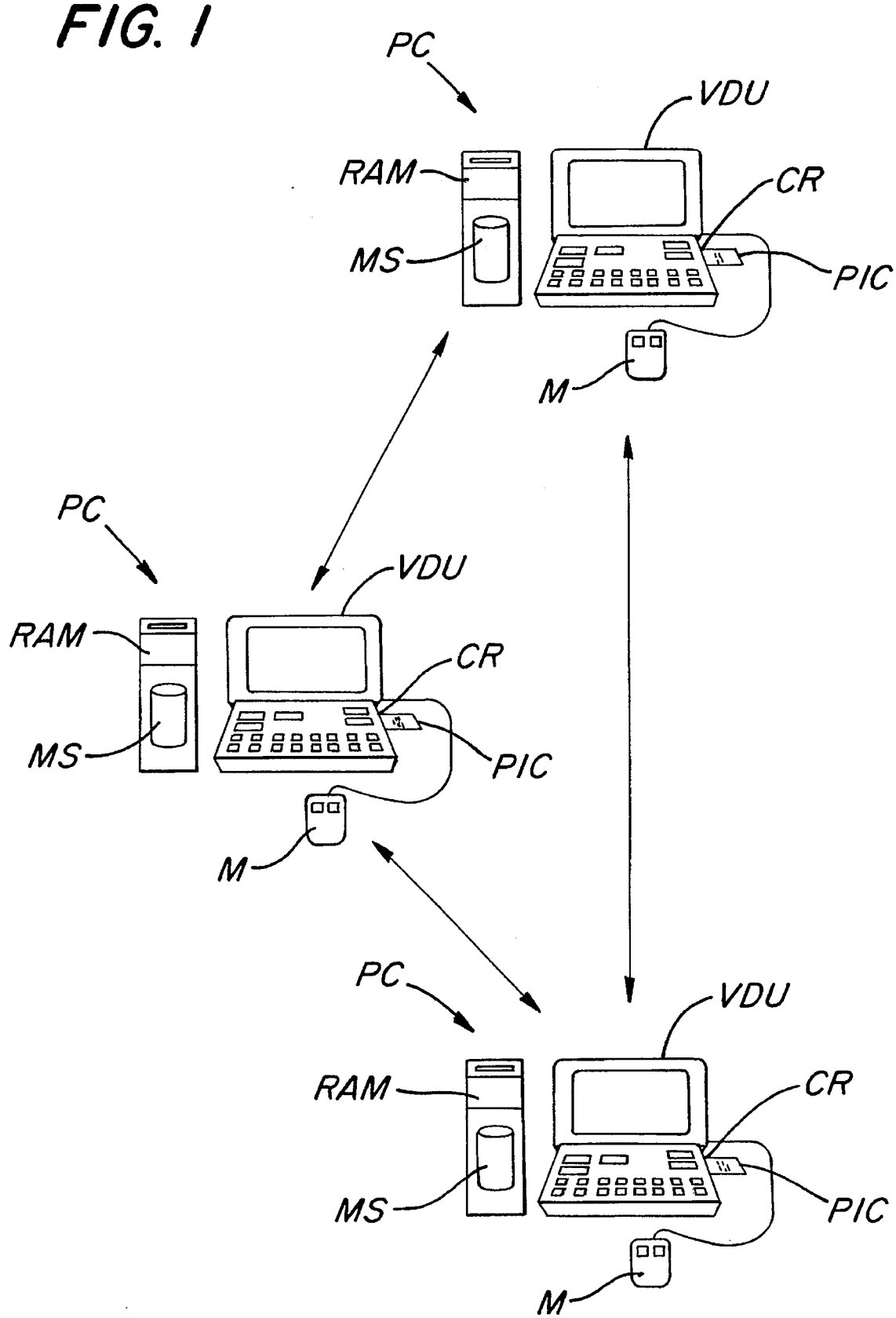
FIG. 1 is a schematic design of an object based computer system embodying the invention.

Referring to FIG. 1 there is shown an object based computer system which comprises a network of personal computers PC, each of which has a central processor unit CPU; random access memory RAM; mass storage facilities MS; a visual display unit VDU and a mouse M. In the drawing these units are designated for one computer only. Each computer also has a card reader CR.

The mass storage facilities MS constitute domains in the system which are generally associated with the user or users who habitually use that computer. Thus, objects associated with those users are stored there. These objects include, for example, the desk top objects for each habitually local user.

Figure 2:
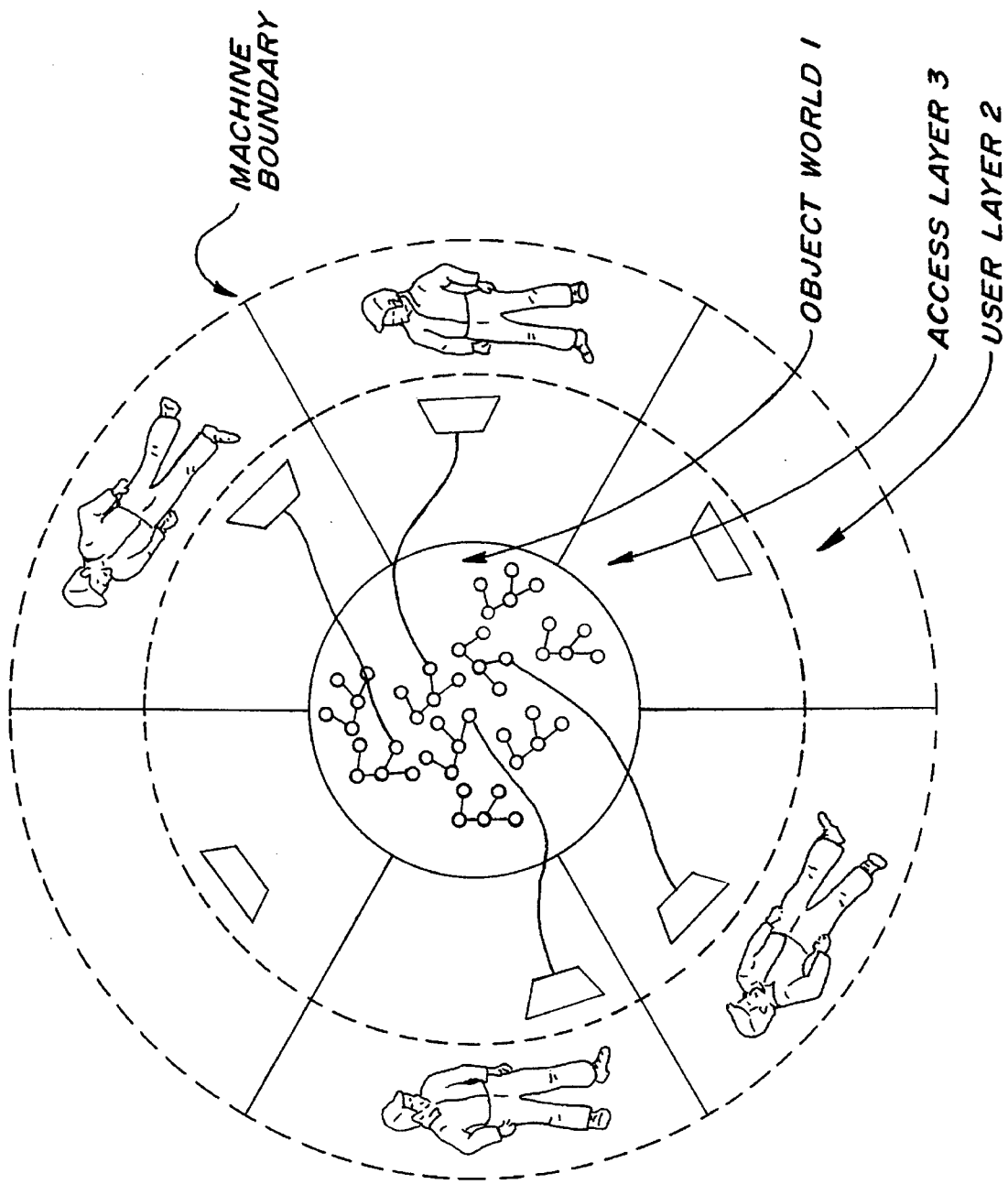
FIG. 2 is a diagram illustrating the user's model of a system which incorporates the invention.

Referring to FIG. 2 there is shown a model of a distributed office computer system which comprises several computers linked together in a network as in FIG. 1. Each computer has the usual input/output facilities of keyboard, mouse and VDU as well as a CPU and hard disk on which are held object files. The core of the system is the object world 1 containing objects to which the users 2 have access.

Figure 3:
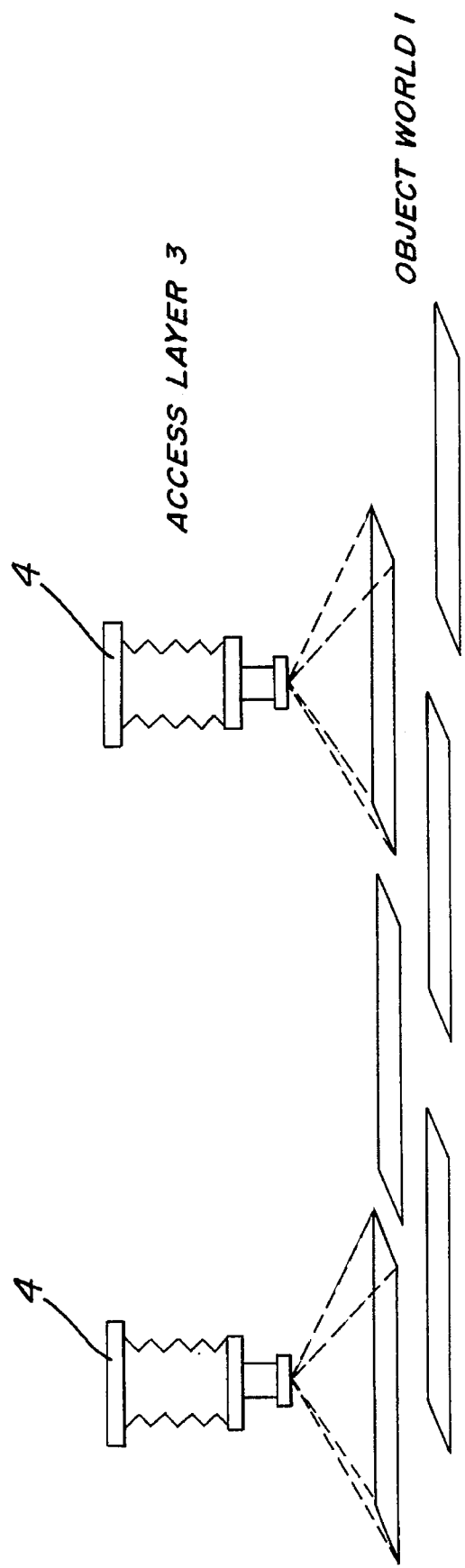
FIG. 3 is a further diagram illustrating part of the user's model of the system.

An important aspect of the system is the model of it which the user has. Critical in this is a layered structure which includes an access layer 3 whereby the users gain access to the objects in the object world 1. FIG. 3 shows more specifically the access layer including viewers 4 which are window objects and which are able to be navigated to observe and manipulate different objects in the object world. It is important to note the concept of navigation of a viewer between objects in this system. A user does not need to open a new window for each object. The viewers must be regarded as mechanisms in their own right.

Figure 4:
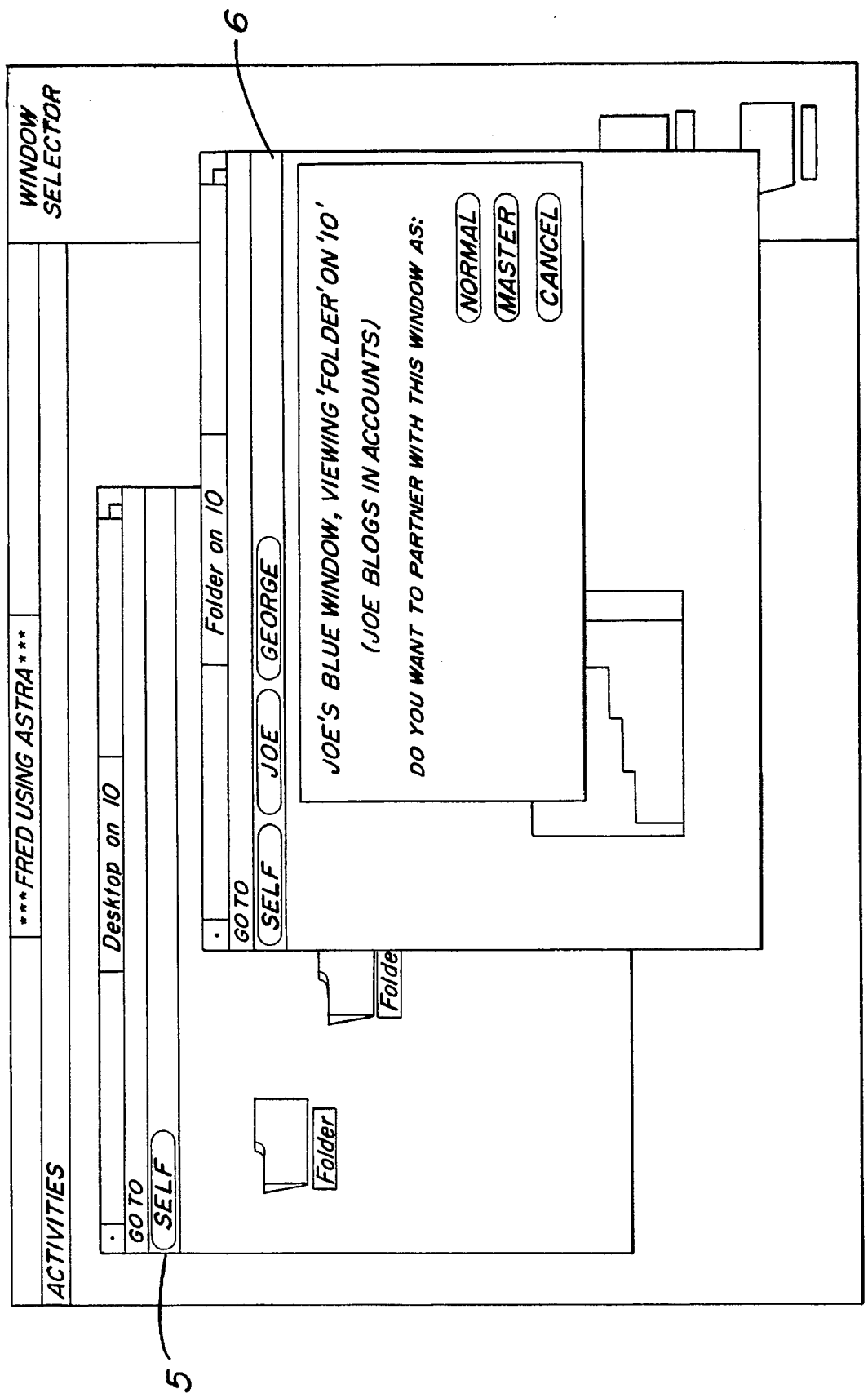
FIG. 4 is a diagram of a user's view of a system having a presence mechanism and coupling facility in accordance with the invention.

Since a feature of the system is that multiple viewers may be linked to the same object and each viewer has the capability not only to observe but also observe unexpected results. For example, icons might move or data might change. To facilitate an understanding of such effects the present invention provides viewers with indications of concurrent viewers. This is shown in FIG. 4, where there is shown a presentation which has a first window which has been opened on "Desktop on IO" and a second window which has been opened on "Folder on IO". Both windows have presence bars 5 and 6 respectively. Bar 5 shows only "self" which indicates that no other viewers are open on the object of that window. Bar 6 on the other hand shows that in addition to "self" there are the viewers of "Joe" and "George". What is immediately clear, therefore, is that users Joe and George will be viewing "Folder on IO". All three users will observe the same view of "Folder on IO" and will be able to manipulate that object. Each presence indicator has a border of a particular colour corresponding to the viewer in question. The presence of the displaying viewer is always shown as the first in the list. The bar may be switched off by the user to conserve screen space.

The present invention provides for the sharing of expertise by means of a coupling facility for viewers. The fundamental concept needed for sharing is that of partnership. Two viewers can set themselves up as partners, which means no more than an agreement to pass each other information. Partnership is one to one agreement between two viewers, but a viewer may be part of several agreements. This is how viewer sharing is achieved.

When a viewer adds another viewer as a partner, the viewer can send and receive a special set of messages which make up the partnership protocol. The messages embody viewer level operations, but are informative in nature, and should not be interpreted as commands. What prompts a viewer to send a message, and how a recipient responds are not predetermined. Thus, a viewer may send the message 'I have changed to look at object X', but there is no guarantee that the sender actually is looking at X, nor is there any guarantee that the recipient will itself go and look at X. It is important to understand that it is the viewers which determine how they interpret and react to the protocol. This is the basis of the partnership concept—an agreement to talk. The semantics of the dialogue are decided by the parties involved.

Thus, two viewers may set themselves up as partners, with the understanding that they will attempt to 'shadow' each other. If the sharing was set up on an equal (normal/normal) basis, then the recipient of 'I have changed to look at object X' will decide to look at X also. At this level we have the effect of sharing navigation. It is easy to see how unequal (master/normal) sharing would be set up under such a system—the 'master' viewer need only ignore the messages from the normal.

Note that the agreements described work solely at the access layer level. If two partners are viewing the same object, then they can each access and manipulate that object to the same extent that they could if they were independent.

FIG. 4 shows the position where not only are the "SELF" and "JOE" viewers linked to the "Folder on IO" objects but also a request has been set up to couple these two viewers. The "SELF" viewer is displaying a menu which allows the user to select whether to partner the JOE viewer on (a) a "normal" basis (b) a "master" basis or (c) not at all (cancel).

Partnership on an equal (master/master) basis will allow the mutual transmission and display of navigational messages between the coupled viewers. In this way either viewer can follow the other at will or diverge. Partnership on a normal basis will allow incoming navigational messages to "SELF" from "JOE" (in this instance) to be treated as commands so that the SELF viewer automatically follows the navigation of the JOE viewer around the object world. In this way the JOE user can guide the SELF user around the system.

Figure 5:
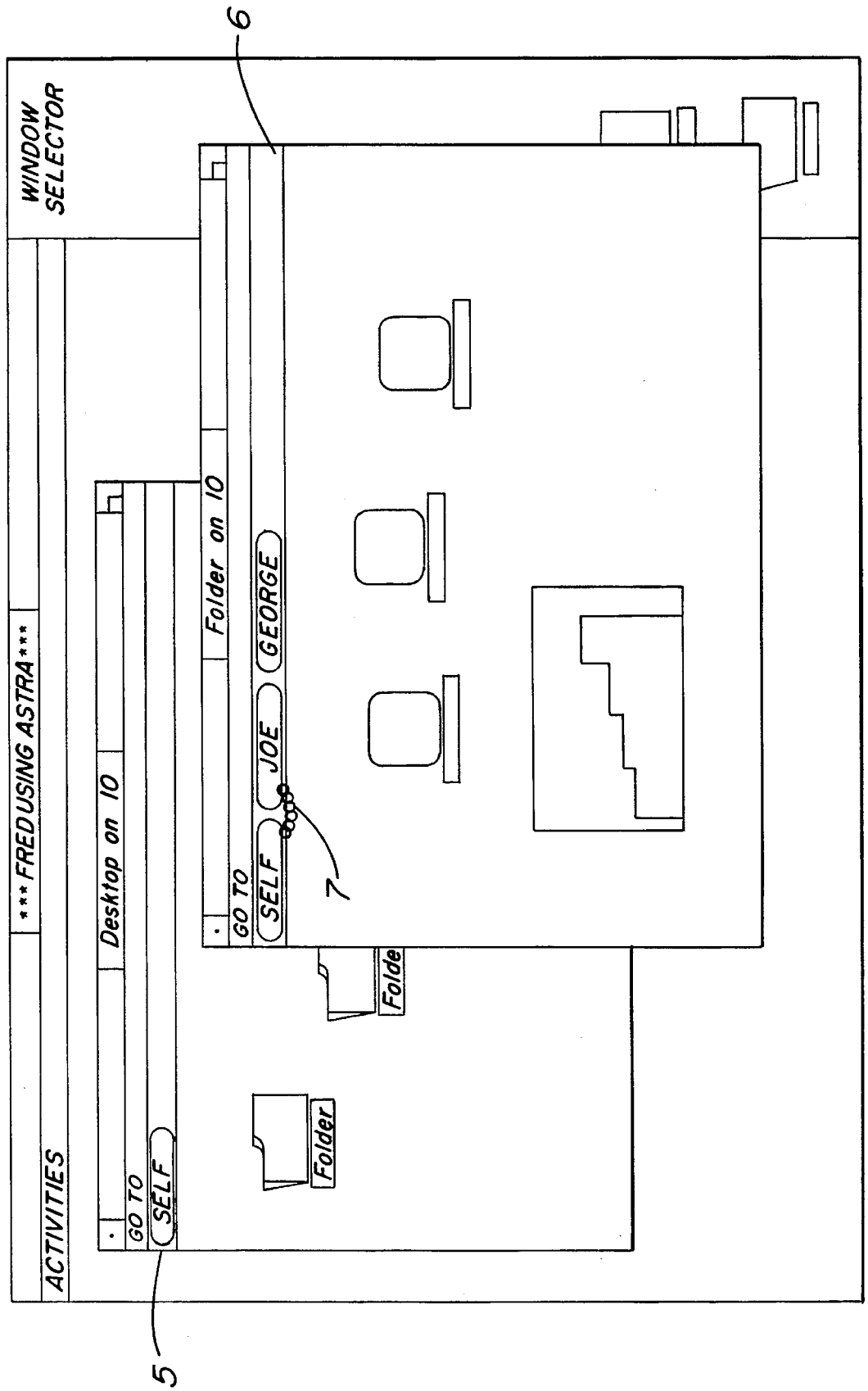
FIG. 5 is a diagram illustrating the appearance of a coupling inculcator.

Referring to FIG. 5 there is shown a graphical representation of the fact that the SELF viewer is coupled to the JOE Viewer. This is in the form of a chain 7. Coupling is effected by establishing the chain link by means of the mouse and icon system.

Figure 6:
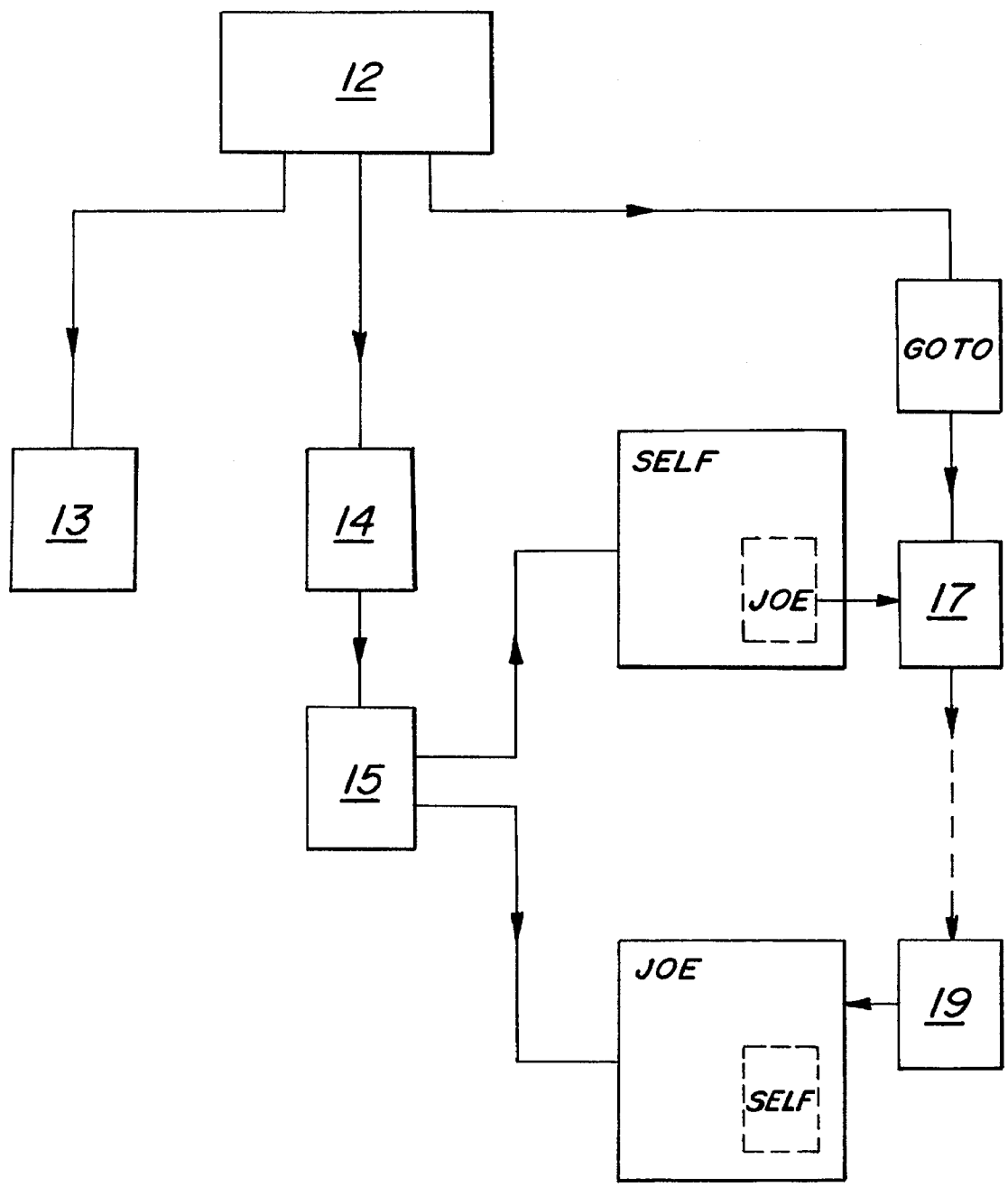
FIG. 6 is a schematic diagram illustrating program procedures in the coupling of two viewers.

Referring to FIG. 6 there is shown schematically the set of program procedures which allow the coupling facility to be effected. A procedure 12 is a mouse control procedure which monitors the position of the mouse and the state of its buttons. When the viewer shows a presence bar 6 as shown in FIG. 4 it is possible to click the mouse on one of the viewer buttons "JOE" or "GEORGE". Procedure 12 responds to this to call a dialogue procedure 13. This displays the dialogue box shown in FIG. 4. It is then possible to click the mouse on "NORMAL", "MASTER" or "CANCEL". An appropriate message is derived from the mouse control procedure to record the type of link required in a data structure. Then with the mouse button held down while over "SELF" and the mouse drawn to "JOE" and released a DrawLinkChain procedure 14 is invoked to draw the chain 7 on the screen (FIG. 5).

A procedure 15 called AddLink is invoked for viewer "SELF" in order to establish the appropriate data structures which causes the "SELF" viewer to be linked to the "JOE" viewer With the selected coupling mode (master or normal). This results in the construction of a data structure associated with viewer "SELF" having a "table" with contents representative of the viewer "JOE".

Procedure 15 then messages viewer "JOE" and this results in creation of a "table" associated with "JOE" with contents representative of the linked viewer "SELF".

As described above, coupling of viewers is effected when they rendezvous to view a common object. The presence mechanism is effective to ensure that the object being viewed has a table of the viewers which are viewing it.

When viewers are coupled, if the user of the "SELF" viewer elects to view another object a GOTO function calls an informant procedure 17 with a message and the procedure identifies, from table 18, all the viewers coupled to "SELF" and sends information to them via an IWentToMessage. An interpreter procedure 19 interprets such messages received from other viewers and acts according to the coupling mode in effect. If the receiving viewer is "master" it displays the IWentTo message for information. If the receiving viewer is normal the tests are made by procedure 19 to determine whether the viewer is already viewing the object and if not a GOTO instruction is issued to cause the receiving viewer to follow the sending viewer.

What is claimed is:

1. An object based computer system, comprising:

at least one computer;

a plurality of objects including at least two semantic objects;

object manager means for managing the plurality of objects;

a plurality of viewers, each viewer being linked to one of the semantic objects wherein a plurality of viewers are linkable to the same semantic object to allow concurrent observation of that semantic object;

presence mechanism means for notifying each viewer linked to the same semantic object of the presence of other viewers currently linked to that semantic object by means of an indication on each of the plurality of viewers linked to the same semantic object; and navigational coupling means for coupling together two viewers linked to the same semantic object so as to pass a navigational message generated by a first one of the plurality of viewers to a second one of the plurality of viewers so that when the first one of the plurality of viewers becomes linked to another one of the semantic objects then so does the second one of the plurality of viewers whereby the first one of the plurality of viewers leads the second viewer around and between objects in the system.

2. An object based computer system as claimed in claim 1, further comprising means for allowing a user to select a coupling mode to establish a hierarchical or an equal relationship.

3. An object based computer system as claimed in claim 2, wherein in a hierarchical relationship one viewer is a master and the remaining viewer or viewers coupled thereto are normal.

4. An object based computer system as claimed in claim 3, wherein navigation of a master viewer to view a fresh object causes corresponding and automatic navigation of normal viewers coupled thereto to view the same object.

5. An object based computer system as claimed in claim 3, wherein navigation of a normal viewer to view a fresh object causes display of an information message in the viewers coupled thereto.

6. An object based computer system as claimed in claim 4, wherein navigation of a normal viewer to view a fresh object causes display of an information message in the viewers coupled thereto.

* * * * *